E. CONKLIN.
Weather-Strip.
No. 208,466. Patented Oct. 1, 1878.
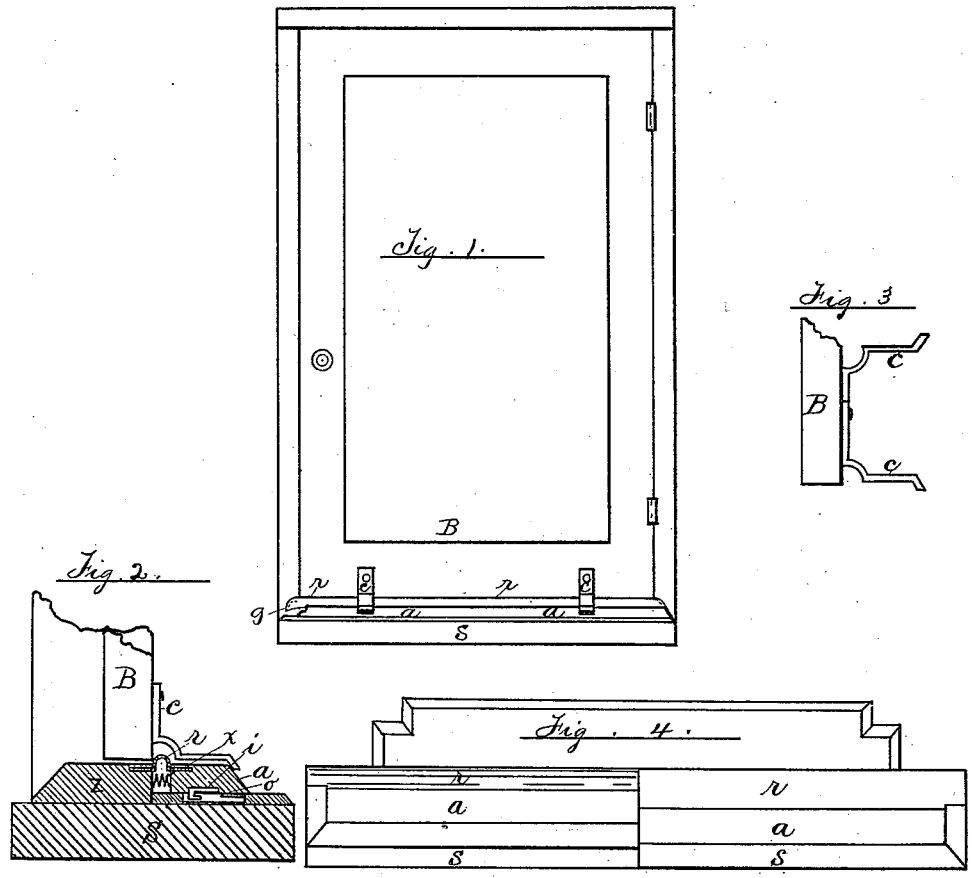
Witnesses
Thos H Hutchins
Wm J Hutchins
Inventor
Edward Conklin

UNITED STATES PATENT OFFICE.

EDWARD CONKLIN, OF CHANNAHON, ILLINOIS.

IMPROVEMENT IN WEATHER-STRIPS.

Specification forming part of Letters Patent No. 208,466, dated October 1, 1878; application filed May 27, 1878.

*To all whom it may concern:*

Be it known that I, EDWARD CONKLIN, of Channahon, in Will county, State of Illinois, have invented certain Improvements in Weather-Strips for Doors, the construction and operation of which I will proceed to explain, reference being had to the annexed drawings, making a part of this specification, in which—

Figure 1 is a front elevation of the door having the weather-strip attached; Fig. 2, a cross-sectional view of the weather-strip through the center; Fig. 3, a side elevation of the door with the strip-catches attached, and Fig. 4 a plan view on the top of the strip for double doors divided at the center.

The object of the invention is to furnish a means of closing the aperture underneath the door when it is shut, to keep out air, dust, rain, &c., by bulging up a strip of rubber against the lower inner corner or edge of the door by catches on the bottom of the door.

In the drawings, B represents the door, having two or more metal catches, $c\,c$, attached by means of a screw, so that they may be turned up or down, as may be desired, as shown in Fig. 3, and, when not use, do not thereby engage with the strip $a$, if it should be desired not to operate the strip at times.

The threshold of the door is constructed in two parts, $z$ and $a$, connected at the top by means of a thin rubber strap or strip, $r$, as shown more particularly in Fig. 2. As the door B is closed the strip-catches $c$ engage with the half $a$ of the threshold, bringing it forward toward the opposite half, $z$, of the threshold, causing the rubber strip $r$ to bulge up against the lower corner or edge of the door B, as shown in said figure, which closes the opening under the door, and also closes up against the casing of the door, as shown at $g$, Fig. 1, so that rain will not run down the jam and run inside the rubber $r$. The rubber $r$ closes at each end with the floor, so that water or dust will not get under it.

As the door B opens, the coil-spring $x$ throws the part $a$ of the threshold back, so as to bring the rubber $r$ down flat and even with the top of the threshold, so that it will be out of the way.

To the under side of the part $a$ of the threshold is attached a hook, $i$, which hooks in under the lip $o$, to hold the part $a$ of the threshold down in place when the door is open.

For double doors the whole arrangement may be made in two pieces, divided at the center, as shown in Fig. 4, each half accommodating a single door as conveniently as though there was but one door. The catches $c$ may be constructed of one long continuous strip of metal, reaching the whole width of the door, if desired, which, perhaps, might give a better appearance to the catch.

Having thus described my invention, what I claim as new, and desire to secure by Letters Patent, is as follows, to wit:

1. The combination and arrangement of the fixed threshold $z$, movable threshold $a$, rubber strip $r$, connecting the thresholds $z$ and $a$, hook $i$, lip $o$, and catches $c$, for the purpose of closing the opening under the door B, in the manner and for the purpose set forth.

2. The mode of closing the opening under the door B by bulging up a strip of rubber, $r$, or other flexible material, under the inner lower edge of the door by means of a movable or reciprocating threshold, $a$, in the manner substantially as set forth.

EDWARD CONKLIN.

Witnesses:
THOS. H. HUTCHINS,
WM. J. HUTCHINS.